Nov. 15, 1927.
W. G. McADOO
1,648,992
CARRYING AND DISPENSING KIT
Filed Dec. 16, 1924
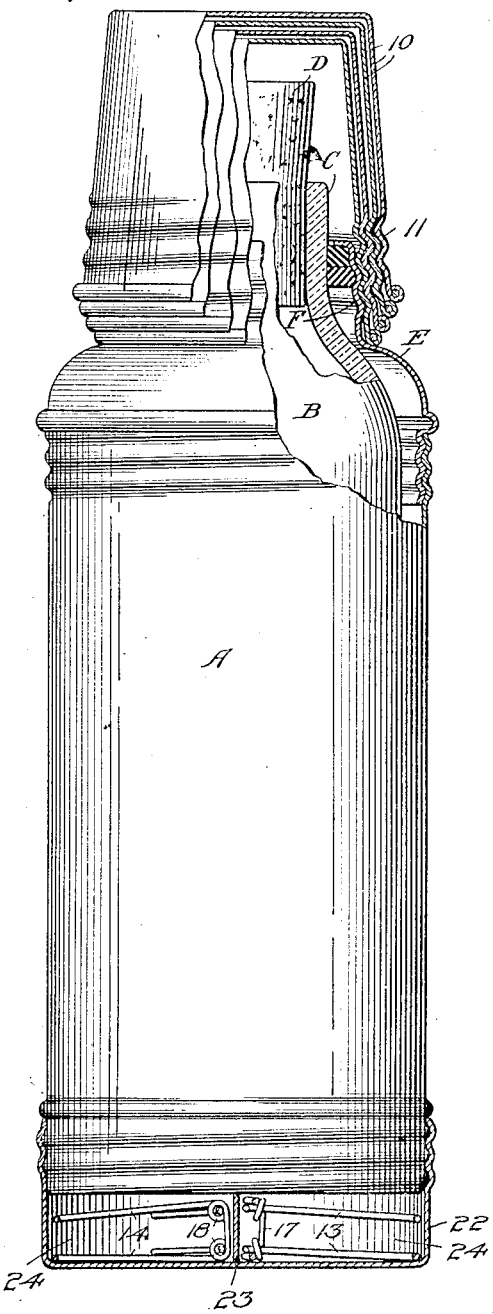
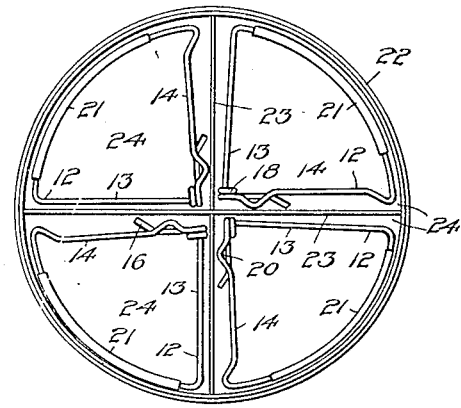
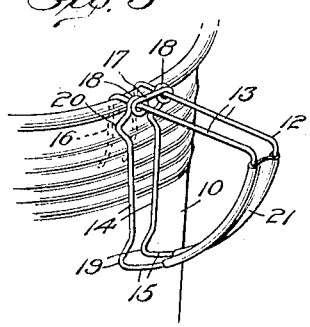
Inventor.
William G. McAdoo
By
his Attorney Patented Nov. 15, 1927.

1,648,992

UNITED STATES PATENT OFFICE.

WILLIAM G. McADOO, OF LOS ANGELES, CALIFORNIA.

CARRYING AND DISPENSING KIT.

Application filed December 16, 1924. Serial No. 756,294.

The invention relates to portable containing and dispensing kits, and has particular reference to vacuum bottles or other similar containers or receptacles.

The primary object of the invention, generally stated, is to provide a dispensing kit including or comprising in combination with a receptacle for liquids or other substances, a series or plurality of cups or other individual serving receptacles and handle devices to be attached to the serving cups.

Another object of the invention is to provide a kit of this character in which the individual serving cups or receptacles as well as handles or holding means therefor, may be combined with a vacuum bottle or other similar container so that the entire outfit may be conveniently carried as a single article.

Another object of the invention is to provide a portable device or kit of this nature in which the nested individual cups may be mounted upon one end of the container to serve as a cap therefor and in which the handle compartment may be formed as an auxiliary shell member detachably engaged upon the other end of the container so that the various elements will be maintained in compact form for insuring the utmost convenience in transportation and in use, the various elements being, moreover, easily accessible when use is required.

With the above objects in view, the invention consists in the combination and arrangement of parts to be hereinafter more fully described and claimed and illustrated in the accompanying drawings though it should be distinctly understood that the disclosure is merely illustrative and the parts may be changed or rearranged in order to widen the field of utility and adapt the invention for different purposes, such variations and modifications being contemplated as within the scope of the invention.

In the drawings:

Figure 1 is a side elevation of a vacuum bottle with parts broken away and in section and showing a plurality of serving cups mounted upon one end thereof in nested relation and showing a storage compartment for handles on the other end thereof.

Figure 2 is a plan view of the storage compartment detached from the bottle and containing a plurality of handles.

Figure 3 is a fragmentary perspective view showing one of the handles in operative position upon a cup.

Figure 4 is a detail elevation of one of the handles.

Referring more particularly to the drawings, I have illustrated a conventional type of vacuum bottle or container including an outer metallic shell or casing A within which is mounted the glass bottle B having a neck C normally closed by a stopper D. The shell or casing A has a neck portion E which is ordinarily threaded, as shown at F, for engagement of a cap thereon, which cap is employed for the purpose of protecting the bottle neck and preventing the stopper from being displaced.

One manner of carrying out my invention is to provide a plurality of individual receptacles or cups 10 of progressively varying sizes so as to be capable of being nested or inserted one within another. Any desired means might be provided for holding the cups in their nested relation and for holding the entire group or series upon or in association with a vacuum bottle, though for the sake of illustration I have shown all of the cups as pressed or otherwise formed to provide threaded portions 11 which will interengage, as indicated in Figure 1, the threaded portion of the innermost cup being adapted to be screwed onto the threaded portion F of the shell or casing section E. The nested cups will when attached to the bottle serve as a cap to protect the neck of the same and prevent the accidental loss of the stopper.

I further contemplate the use of handle devices, indicated generally by the numeral 12, which are adapted to be engaged upon the cups when using the latter to contain heated liquids such as coffee, hot chocolate or the like. While the specific construction of the handle members is capable of variation, I have illustrated a very convenient form in which the member is constructed of a single piece of resilient material, such as wire or the like, bent preferably into substantially quadrant shape and including arm portions 13 and 14 extending at substantially right angles and connected by portions 15 which may conveniently be arcuate. The ends of the arm portions 13 are laterally directed, as indicated at 16 to form jaws, and are outwardly flared or curved with respect to the arm portions 14 to facilitate engagement upon the edge of a cup. The arm portions 14 are connected by a bridge portion 17 and are preferably coiled or otherwise formed to define guide eyes or loops 18 which embrace the arm portions 13 and which are slidable therealong. At the junctures of the arm portions with the curved connecting portions 15, the bends 19 are preferably acute so as to define high points or projections 19 adapted to bear against the outer surface of the cup. Near the eyes 18 the arms 14 are preferably bent to define projections 20 which will likewise bear against the outside of the cup. This particular formation of the arms 14 will cause the intermediate portions thereof to be spaced away from the cup so that the finger tips may be inserted between the arm portions 14 and the cup for drawing the former away from the cup and permitting disengagement of the handle therefrom. The curved portions 15 of the handles are preferably provided with a sheet-metal or other guard or stiffening member 21 which may be secured thereto as for instance by curling or crimping the edges about the rods or bars.

A plurality of handle devices is provided, the number corresponding preferably to the number of cups and to render the handles convenient I provide a storage compartment within which the handle devices may be placed when not in use. I have illustrated a very convenient arrangement of a storage compartment which involves the use of a shell member 22 detachably engaged upon the bottom of the shell or casing A, as for instance by threading thereonto, as shown in Figure 1. This shell member 22 may be provided interiorly with transverse partitions 23 disposed in intersecting relation and defining compartments 24 within which the handle devices 12 may be disposed. By giving these handle members the substantially quadrant shape above mentioned and illustrated in the drawings, it is obvious that they will fit neatly within the respective compartments. As the compartments are separated by the partitions, the different handle members therein will be prevented from becoming entangled and they will consequently be maintained in such condition and position that any or all may be lifted out with the utmost ease when use is desired.

Having now described my invention, what I claim as new and desire to secure by Letters Patent, is:

1. A portable dispensing kit comprising the combination of a container, a plurality of individual serving receptacles arranged in nested relation and normally carried thereby, a storage compartment carried by the container, and a plurality of handle members normally contained within said compartment and adapted for engagement upon the respective serving receptacles.

2. In combination, a dispensing container, a plurality of individual serving receptacles, means for detachably mounting the receptacles upon the container, a plurality of handle members adapted to be engaged upon the respective receptacles, and means for mounting a compartment adjacent the container for normally containing the handle members.

3. A portable dispensing kit comprising, in combination, a container, a plurality of serving cups arranged normally in nested relation and detachably mounted upon the container, handle members adapted to be engaged upon the respective cups, and means upon the container within which the handle members may be stored when not in use.

4. A dispensing kit comprising, in combination, a container, a plurality of serving cups normally arranged in nested relation and detachably mounted upon one end of the container and constituting a cap therefor, a plurality of handle members adapted for engagement upon the individual cups, and a shell member detachably engaged upon the container and constituting a storage compartment for the handle members.

5. In combination, a container, a plurality of serving cups normally arranged in nested relation and screwed onto one end of the container, a plurality of handles for the respective cups, and a shell member screwed onto the container and serving as a storage compartment for the handles when the latter are not in use.

6. In combination, a container, a plurality of cups normally arranged in nested relation and telescoped onto one end of the container and serving as a cap therefor, a compartment member telescoped onto the other end of the container, and handles for the cups normally disposed within said compartment member.

7. In combination, a container, a cup adapted for connection to said container, and a detachable handle for said cup including pairs of arm members arranged at an angle and having portions connecting the same at one end, guide eyes on one pair of arm members slidably embracingly engaging upon the other arm members, said other arm members having their free ends spaced from the first named arms and coacting therewith to constitute gripping jaws.

8. In combination, a container, a receptacle adapted for connection to one end of said container and a handle device for said receptacle formed from a single length of resilient material and including pairs of spaced arms connected by curved portions, one pair of arms being connected by bridge portions and formed with guides slidably engaged upon the other arms, the intermediate portions of said first named arms being offset toward the curved connecting members, and said other arms having free ends opposite said offset portions and coacting with the first named arms to define clamping jaws.

9. In a combined carrying and dispensing kit including a container and a plurality of nested cups detachably engaged therewith, and individual handles adapted to be engaged upon the cups, means for carrying the handles in assembled relation to the container, comprising a receptacle provided with a plurality of compartments for receiving the individual handles, and means for detachably connecting said receptacle with the container at one end of the latter.

In testimony whereof I affix my signature.

WILLIAM G. McADOO.